United States Patent
Piercy et al.

(10) Patent No.: US 9,332,120 B1
(45) Date of Patent: May 3, 2016

(54) DIALING RULE DETERMINING AND APPLICATION IN A COMMUNICATION SYSTEM

(75) Inventors: Larry H. Piercy, St. Joseph, MO (US); Trey A. Hilyard, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 3016 days.

(21) Appl. No.: 11/565,440

(22) Filed: Nov. 30, 2006

(51) Int. Cl.
| H04M 3/42 | (2006.01) |
| H04M 3/44 | (2006.01) |
| H04L 29/06 | (2006.01) |
| H04M 1/00 | (2006.01) |
| H04L 12/66 | (2006.01) |

(52) U.S. Cl.
CPC ........... *H04M 3/44* (2013.01); *H04L 29/06027* (2013.01)

(58) Field of Classification Search
CPC ........... H04W 8/04; H04W 8/06; H04W 8/12; H04W 60/00; H04W 8/02; H04W 8/20; H04W 8/18; H04W 60/005; H04M 15/8038; H04M 15/715; H04M 2215/2026; H04M 2215/34; H04L 65/1016; H04L 65/1073; H04L 12/5895; H04L 67/14
USPC ........ 370/401, 235, 322; 379/211.01, 201.12, 379/211.02, 212.01, 221.14, 258; 455/414, 455/433, 404.1, 417, 435.1; 709/220, 227, 709/204
See application file for complete search history.

(56) References Cited

U.S. PATENT DOCUMENTS

| 5,973,643 | A * | 10/1999 | Hawkes et al. ............... 342/457 |
| 6,014,377 | A * | 1/2000 | Gillespie ....................... 370/351 |
| 6,259,914 | B1 * | 7/2001 | Koster ....................... 455/432.1 |
| 6,542,733 | B1 * | 4/2003 | Dennis ....................... 455/414.1 |
| 6,782,258 | B2 * | 8/2004 | Ung et al. .................. 455/432.1 |
| 6,856,598 | B1 * | 2/2005 | Stanfield ....................... 370/235 |
| 6,978,132 | B1 * | 12/2005 | Sladek et al. .............. 455/432.2 |
| 6,980,642 | B1 * | 12/2005 | Hung et al. .............. 379/355.05 |
| 7,398,087 | B1 * | 7/2008 | McConnell et al. ........ 455/435.1 |
| 2002/0054667 | A1 * | 5/2002 | Martinez ......................... 379/45 |
| 2002/0080751 | A1 * | 6/2002 | Hartmaier ..................... 370/338 |
| 2004/0141508 | A1 * | 7/2004 | Schoeneberger et al. ..... 370/401 |
| 2005/0041793 | A1 * | 2/2005 | Fulton et al. ............. 379/211.01 |
| 2005/0059394 | A1 * | 3/2005 | Easley ............................ 455/433 |
| 2006/0095575 | A1 * | 5/2006 | Sureka et al. ................. 709/227 |
| 2006/0205404 | A1 * | 9/2006 | Gonen et al. ............... 455/432.1 |
| 2007/0174142 | A1 * | 7/2007 | Kissel, Jr. ....................... 705/27 |
| 2008/0114862 | A1 * | 5/2008 | Moghaddam et al. ........ 709/220 |

* cited by examiner

*Primary Examiner* — Ahmad F Matar
*Assistant Examiner* — Kharye Pope (57) ABSTRACT

A call processing system for processing calls in a communications network comprising an interface configured to receive a message to register a device with a communications network, wherein the message indicates a device code associated with the device and a processing system configured to process the message to determine a directory code associated with the device based on the device code, process the directory code to determine an override dialing rule based on the directory code, and apply the override dialing rule to calls placed from the device.

30 Claims, 7 Drawing Sheets

| DEVICE CODE | OVERRIDE | DEF. DIALING RULE |
|---|---|---|
| 1234 | Y | 2ND PORTION ONLY |
| 4321 | N | 2ND PORTION ONLY |
| 8765 | Y | 1ST AND 2ND PORTION |

502 →

| DIR. CODE | OVERRIDE DIALING RULE |
|---|---|
| 2225551212 | 2ND PORTION ONLY |
| 3335551212 | 1ST AND 2ND PORTION |
| 1115551212 | 2ND PORTION ONLY |

DIALING RULE DETERMINING AND APPLICATION IN A COMMUNICATION SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of telecommunication services, and in particular, to a system that provides telephony services in a communications network.

2. Description of the Prior Art

Telecommunication regulations require carriers to enforce dialing rules. For example, the Federal Communication Commission mandates the number of digits dialed from a particular phone based on the numbering plan area (NPA) of an NPA-NXX-XXXX formatted phone number. Users in a particular NPA may be required to dial all 10-digits of an NPA-NXX-XXXX phone number. Users in another NPA might be required to dial only 7 digits.

In wireless networks, dialing rules are determined based on a device code provided from a device to the network during registration. A mobile station identifier (MSID) is an example of a device code, and a handset is an example of a device. When a user powers on a handset, the handset sends its MSID to a call processing system. A mobile switching center (MSC) is an example of a call processing system. An MSC uses the MSID to determine what dialing rules to enforce for calls placed from that handset. However, determining dialing rules based on the MSID has proven unreliable.

Directory codes from originating handsets could be used to determine dialing rules reliably. A phone number, or mobile directory number (MDN), is an example of a directory code. However, it is difficult for wireless carriers to obtain MDNs because handsets register with MSIDs, not MDNs. Additionally, carriers typically shield their customers' MDNs from other carriers.

SUMMARY OF THE INVENTION

An embodiment of the invention helps solve the above problems and other problems by basing dialing rules on MDNs. An embodiment of the invention is a call processing system that comprises an interface and a processing system. The interface receives a message to register a device with the communications network. The message indicates a device code associated with the device. The processing system processes the message to determine a directory code associated with the device code. The processing system processes the directory code to determine an override dialing rule based on the directory code. The processing system applies the override dialing rule to calls placed from the device.

In an embodiment of the invention, a default dialing rule applies to calls placed from the device. Also, the processing system processes the device code to determine if the override dialing rule overrides the default dialing rule.

In an embodiment of the invention, the processing system overrides the default dialing rule with the override dialing rule if the device code is within a range of codes.

In an embodiment of the invention, the directory code comprises a phone number.

In an embodiment of the invention, calls are placed from the device to phone numbers having a first portion and a second portion.

In an embodiment of the invention, the override dialing rule requires a user to dial the first portion of phone numbers for calls placed from the device.

In an embodiment of the invention, the phone numbers have an NPA-NXX-XXXX format and the first portion of the phone number comprises the NPA part of the NPA-NXX-XXXX format.

In an embodiment of the invention, the override dialing rule allows a user to dial only the second portion of the phone number for calls placed from the device.

In an embodiment of the invention, the phone numbers have an NPA-NXX-XXXX format; the first portion comprises the NPA part; the second portion comprises the NXX-XXXX part of the NPA-NXX-XXXX format.

In an embodiment of the invention, the device comprises a wireless device.

In an embodiment of the invention, a method of operating a call processing system comprises receiving a message to register a device with a communications network; processing the message to determine a directory code associated with the device based on the device code; processing the directory code to determine an override dialing rule based on the directory code; and, applying the override dialing rule to calls placed from the device. The message indicates a device code associated with the device.

In an embodiment of the invention, a software product comprises a computer-readable medium carrying one or more sequences of instructions for operating a call processing system wherein execution of the one or more sequences of instructions by one or more processors causes the one or more processors to receive a message to register a device with a communications network; process the message to determine a directory code associated with the device based on the device code; process the directory code to determine an override dialing rule based on the directory code; and, apply the override dialing rule to calls placed from the device. The message indicates a device code associated with the device.

BRIEF DESCRIPTION OF THE DRAWINGS

The same reference number represents the same element on all drawings.

DETAILED DESCRIPTION OF THE PREFERRED EMBODIMENT

FIGS. 1-7 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment

FIGS. 1-3

Figure 1:
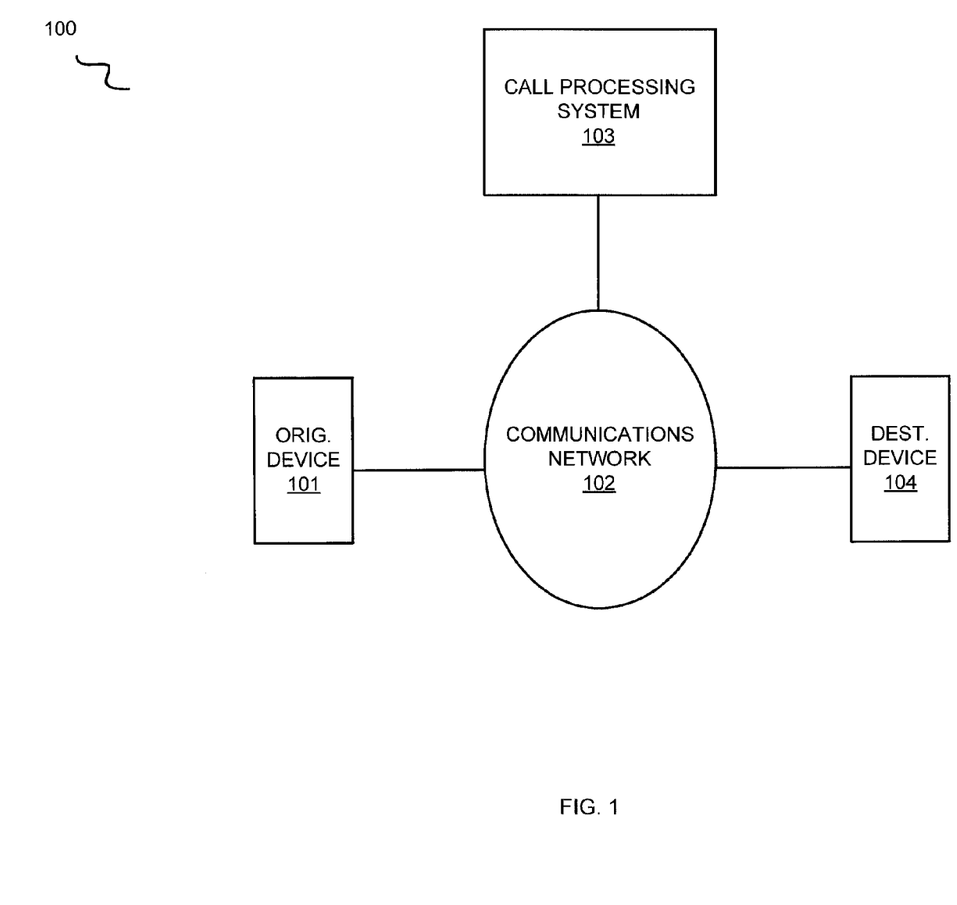
FIG. 1 illustrates a communication system in an embodiment of the invention.

FIG. 1 illustrates communication system 100 in an embodiment of the invention. Communication system 100 includes originating device 101, communications network 102, call processing system 103, and destination device 104.

Originating device 101 is coupled to communications network 102. Communications network 102 is coupled to call processing system 103. Destination device 104 is coupled to communications network 102.

Originating device 101, and destination device 104, could be any communication device or collection of devices capable of communicating or registering with communication network 102 or call processing system 103. Communications network 102 could be any network or collection of networks capable of communicating with device 101, call processing system 103, or device 104. Call processing system 103 could be any device or collection of devices capable of providing services to support telecommunications functionality, such as enforcement of telecommunications regulations; and capable of communicating with or receiving registration messages from communications network 102 or device 101.

Figure 2:
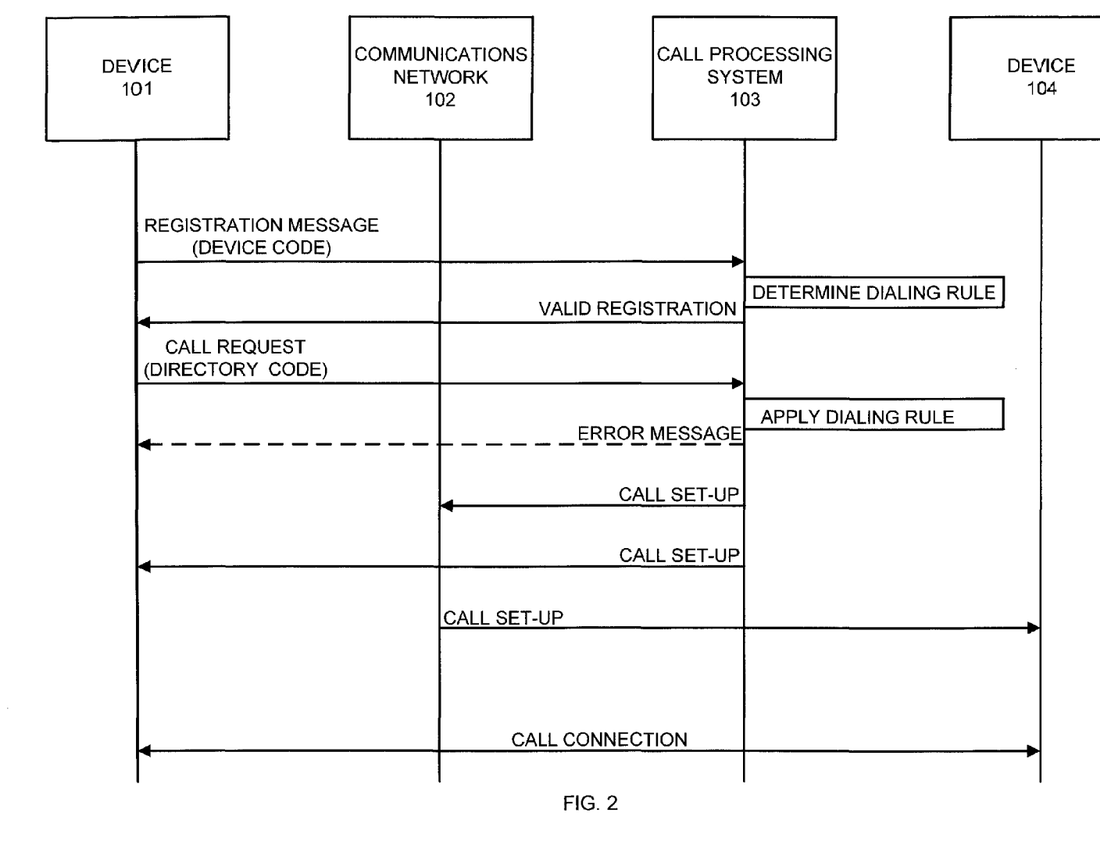
FIG. 2 illustrates the operation of a communication system in an embodiment of the invention.

FIG. 2 illustrates communication system 100 operation in an embodiment of the invention. Before being able to access services such as voice calls, a user's device 101 must register with communication network 102. Device 101 could send a registration message to call processing system 103 when a user powers on device 101. Though there are other events that trigger device 101 to send a registration message, they will not be detailed here in the interest of clarity. The registration message could include a device code, which uniquely identifies device 101. The device code is transparent to the user.

Call processing system 103 is responsible for call control functionality. Call control functionality includes call set-up, device registration, and dialing rule enforcement. Using the device code from the registration message, call processing system 103 determines a default dialing rule for device 101. A dialing rule is a restriction on how directory codes must be dialed on device 101 when the user is placing calls. A directory code is apparent to a user and identifies a device to other devices.

Call processing system 103 determines whether the default dialing rule is overridden by an override dialing rule. Override dialing rules are based on the directory code for the device. The directory code is determined from the device code. Once the dialing rule is established, call processing system 103 could send a valid registration message to device 101.

After receiving a valid registration message from call processing system 103, the user can place calls to a destination device, such as device 104. The user could dial a directory code to place a call from device 101 to device 104. Device 101 could send the directory code in a call request to call processing system 103. If the user has dialed the directory number in accordance with the dialing rule for device 101, call processing system 103 could initiate call set-up processing with communications network 102, and a connection could be established between device 101 and device 104. If the user has dialed the directory number in violation of the dialing rule for device 101, call processing system 103 may reject the call attempt or send an error message to device 101.

Figure 3:
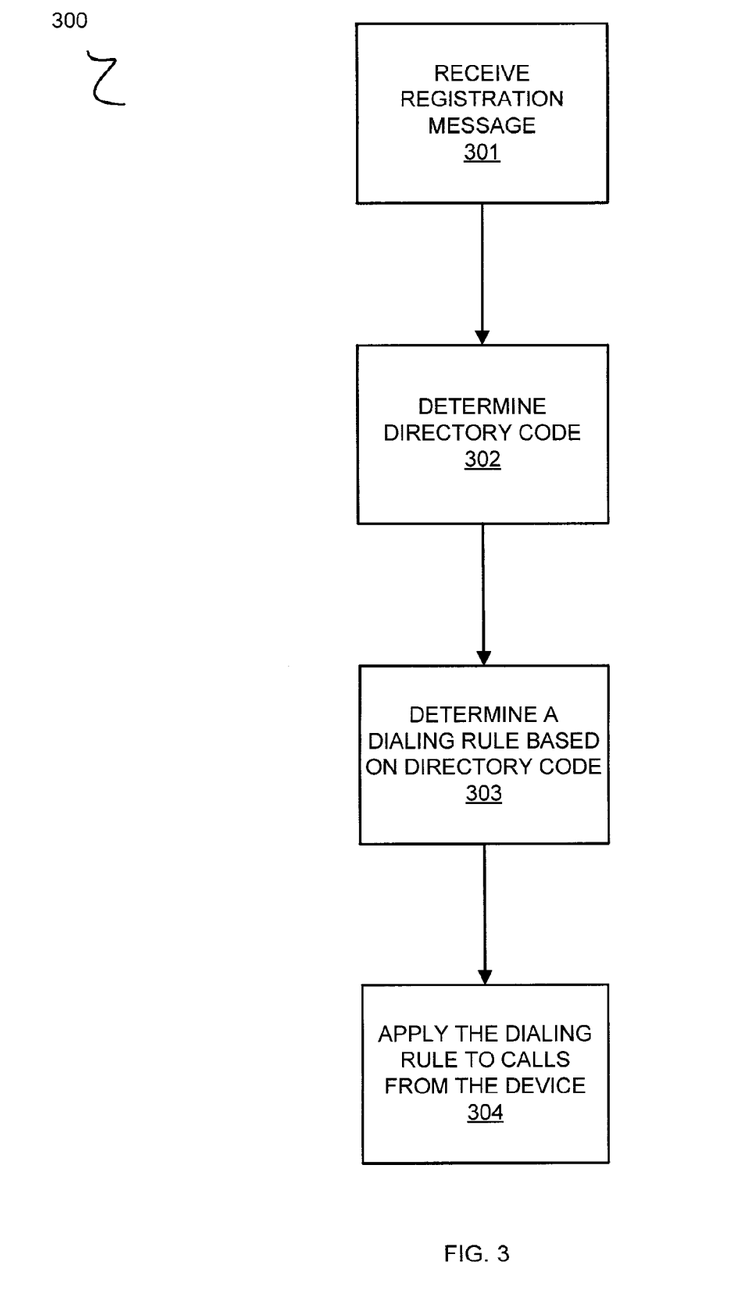
FIG. 3 illustrates a process flow in an embodiment of the invention.

FIG. 3 illustrates call processing system 103 operation in an embodiment of the invention. Call processing system 103 receives from device 101 a message to register device 101 with communications network 102. The message indicates a device code associated with device 101. The device code uniquely identifies device 101. (Step 301). Device 101 could send a message to register the device in response to a number of triggering events, including a user powering on device 101, or when user places a call on device 101.

Call processing system 103 determines a directory code associated with device 101 based on the device code. (Step 302). A directory code is apparent to users and uniquely identifies device 101 to other devices.

Call processing system 103 determines a default dialing rule for calls placed from device 101. The default dialing rule is based on the device code. Call processing system 103 determines whether an override dialing rule overrides the default dialing rule. (Step 303). The override dialing rule is based on the directory code. A dialing rule establishes how a user must dial directory codes for calls placed from device 101.

Once the dialing rule is established, a user can place calls from device 101 to a destination device such as device 104. Call processing system 103 applies the dialing rule to calls placed from device 101. (Step 304). Call processing system 103 may initiate set-up with communications network 102 for calls dialed in accordance with the dialing rule. Call processing system 103 may send an error message to device 101 for calls placed from device 101 not in accordance with the dialing rule.

In an advantage, a call processing system can apply override dialing rules to devices without requiring a device to indicate a directory code in a message to register the device. The call processing system determines a default dialing rule using a device code. If an override dialing rule applies to calls placed from the device, the call processing system determines a directory code associated with the device code, and in turn, determines the override dialing rule using the directory code. Call processing systems can enforce telecommunications regulations without requiring carriers to divulge their customers' directory codes.

Second Embodiment

FIGS. 4-6

Figure 4:
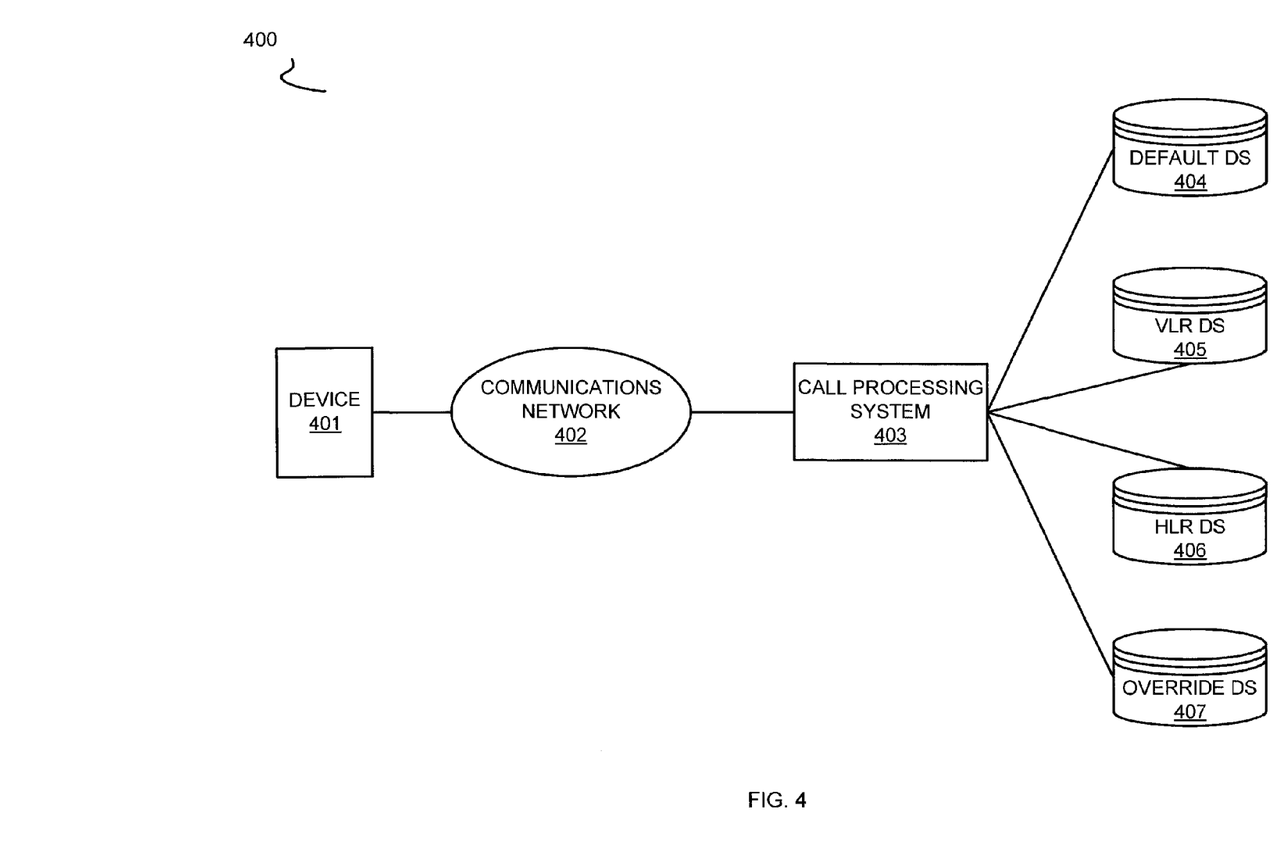
FIG. 4 illustrates a communication system in an embodiment of the invention.

FIG. 4 illustrates communication system 400 in an embodiment of the invention. Communication system 400 includes Device 401, Communications Network 402, Call Processing System 403, Default data structure 404, Virtual Location Register (VLR) data structure 405, Host Location Register (HLR) data structure 406, and Override data structure 407.

Device 401 is coupled to communications network 402. Communications network 402 is coupled to call processing system 403. Call processing system 403 is coupled to Default data structure 404, VLR data structure 405, HLR data structure 406, and Override data structure 407. Examples of data structures include databases, database records, arrays, and tables.

Device 401 could be any communication device or collection of devices capable of communicating or registering with communications network 402 or call processing system 403. Communications network 402 could be any network or collection of networks capable of communicating with device 401, or call processing system 403. Call processing system 403 could be any device or collection of devices capable of providing services to support telecommunications, enforcement of telecommunication regulations, and communicating with or receiving registration messages from communications network 402 or device 401. Default data structure 404 could be any data structure capable of indicating a relationship between a device code and a default dialing rule. VLR data structure 405 could be any data structure capable of indicating a relationship between device 401 and a device code. VLR data structure 405 stores information about all devices currently registered for call processing system 403. HLR data structure 406 could be any data structure capable of indicating a relationship between a device code and a directory code. HLR data structure 406 stores information about every device with a device code that is authorized to use communications network 402. Those skilled in the art appreciate VLR data structure 405 and HLR data structure 406. Override data structure 407 could be any data structure capable of indicating a relationship between a directory code and an override dialing rule.

Figure 5:
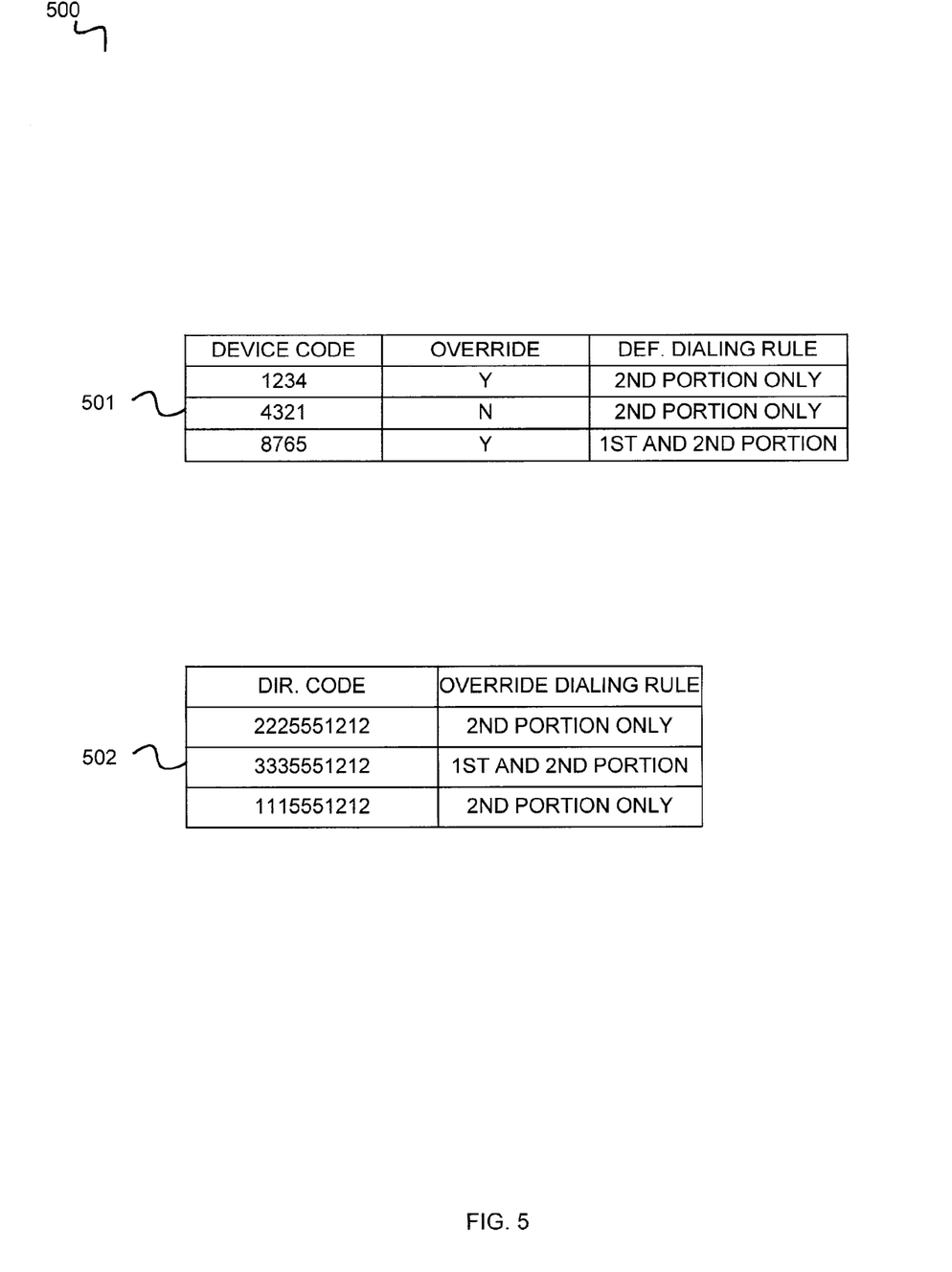
FIG. 5 illustrates call processing tables in an embodiment of the invention.

FIG. 5 illustrates call processing tables in an embodiment of the invention. Call processing table 501 illustrates an embodiment of Default data structure 404. Call processing table 502 illustrates an embodiment of Override data structure 407.

Call processing table 501 provides a default dialing rule for a device associated with a device code, and an indicator as to whether an override dialing rule applies to calls placed from the device. Call processing table 502 provides an override dialing rule associated with a directory code. The override dialing rule overrides the default dialing rule for calls placed from the device associated with the directory code.

Call processing table 501 could comprise 3 fields and 3 entries. The fields could comprise device code, override, and default dialing rule. The first entry could comprise a device code of 1234, an override indicator of 'Y', and a default dialing rule of '2ND PORTION ONLY.' The second entry could comprise a device code of 4321, an override indicator of 'N', and a default dialing rule of '2ND PORTION ONLY.' The third entry could comprise a device code of 8765, an override indicator of 'Y', and a default dialing rule of '1ST AND 2ND PORTION.'

Call processing table 502 could comprise 2 fields and 3 entries. The fields could comprise directory code and override dialing rule. The first entry could comprise a directory code of 2225551212, and an override dialing rule of '2ND PORTION ONLY.' The second entry could comprise a directory code of 3335551212, and an override dialing rule of '1ST AND 2ND PORTION.' The third entry could comprise a directory code of 1115551212, and an override dialing rule of '2ND PORTION ONLY.'

In an example, a user could place a call on a device with a device code of 1234. Call processing system 403 queries call processing table 501 which indicates the device has an override dialing rule. Call processing table 501 also indicates a default dialing rule of '2ND PORTION ONLY.' Call processing system 403 stores the default dialing rule in VLR data structure 405, and determines a directory code of 3335551212 for device code 1234 in a query of HLR data structure 406. Call processing system 403 then queries Override data structure 407 and determines the override dialing rule is '1ST AND 2ND PORTION.' Call processing system 403 replaces the default dialing rule with the override dialing rule in VLR data structure 405. When calls are placed from the device with the directory code 3335551212, call processing system 403 requires the user to dial the first and second portion of the directory code for the destination device. In an example, the first portion is the NPA and the second portion is the NXX-XXXX of a directory code in the NPA-NXX-XXXX format.

In an example, a user could place a call on a device with a device code of 4321. Call processing system 403 queries call processing table 501 which indicates no override dialing rule for device code 4321. Call processing table 501 also indicates a default dialing rule of '2ND PORTION ONLY.' Call processing system stores the default dialing rule in VLR data structure 405. When calls are placed from the device with the device code 4321, call processing system 403 requires the user to dial only the second portion of the directory code for the destination device. In an example, the second portion of the directory code is the NXX-XXXX of a directory code in the NPA-NXX-XXXX format.

Figure 6:
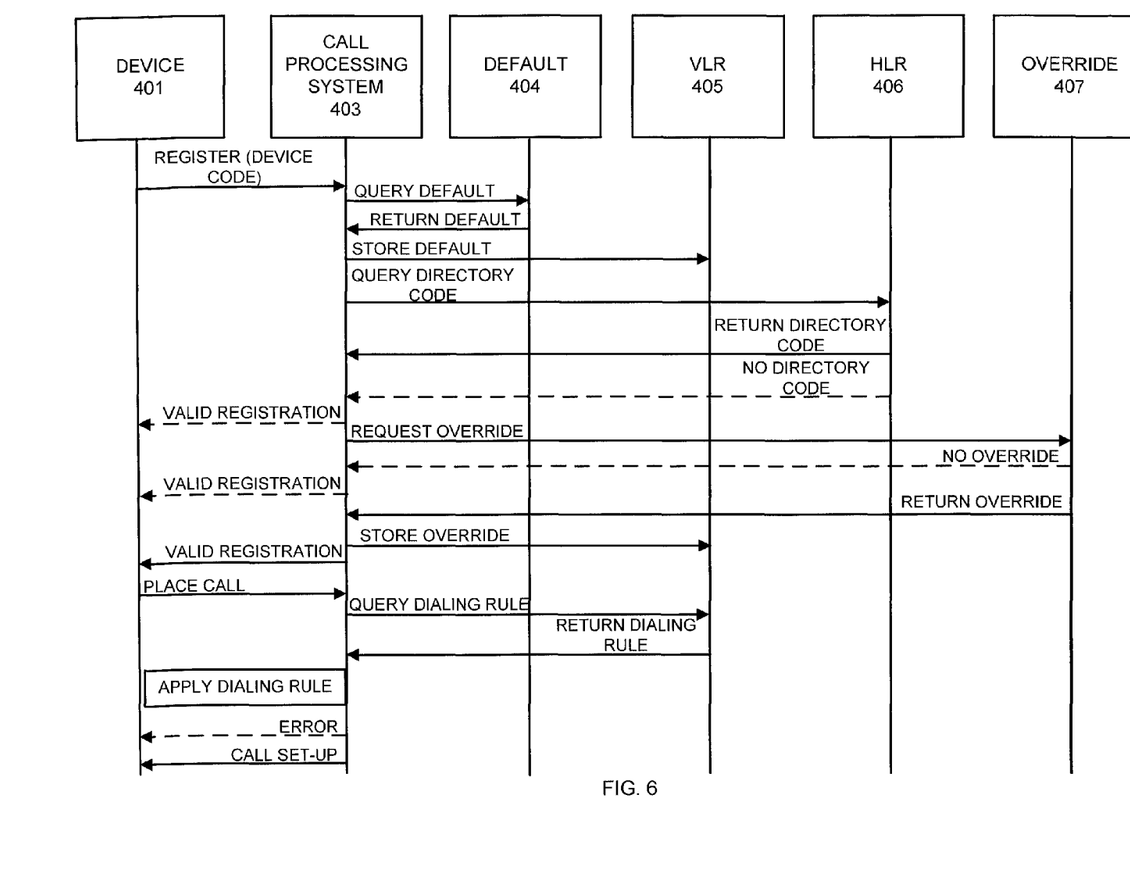
FIG. 6 illustrates the operation of a communication system in an embodiment of the invention.

FIG. 6 illustrates communications system 400 operation in an embodiment of the invention. Before accessing voice call services, a user's device 401 could register with communication network 402. Device 401 could send a registration message indicating a device code to call processing system 403 when a user powers on device 401. Other events could trigger device 401 to send a registration message, though they are not detailed here in the interest of clarity. The registration message could include a device code, which uniquely identifies device 401. A device code is transparent to the user.

Call processing system 403 controls call functionality. Call functionality includes call set-up, device registration, and dialing rule enforcement. Using the device code from the registration message, call processing system 403 could send a query message to Default data structure 404. Default data structure 404 could return a default dialing rule to call processing system 403. A dialing rule is a restriction on how directory codes must be dialed on device 401 when the user is placing calls. A directory code is apparent to a user and identifies a device to other devices.

Call processing system 403 could send a store message to VLR data structure 405 indicating the default dialing rule for device 401. VLR data structure 405 could record the default dialing rule for device 401. When the user places calls over device 401, VLR data structure 405 can be queried for the dialing rule to be applied to calls placed over device 401.

After call processing system 403 sends the store message to VLR data structure 405, call processing system 403 could send a query message to HLR data structure 406 indicating the device code for device 401. If a directory code is not associated with the device code for device 401, HLR data structure 406 could return no directory code to call processing system 403. A directory code is not required for valid registration for device 401. Call processing system 403 could then return a message indicating valid registration to device 401. If a directory code is not associated with the device code for device 401 in HLR data structure 406, the default dialing rule will be applied to calls placed from device 401.

If a directory code is associated with the device code for device 401, HLR data structure 406 could return a directory code for device 401 to call processing system 403. Call processing system 403 could then send a query message to Override data structure 407 indicating the directory code for device 401. Override data structure 407 maintains relationships between directory codes and override dialing rules. An override dialing rule takes precedence over the default dialing rule for device 401. If an override dialing rule is not associated with the directory code, Override data structure 407 could return no override dialing rule to call processing system 403. An override dialing rule is not required for valid registration of device 401. Call processing system 403 could then send a valid registration message to device 401.

If an override dialing rule is associated with the directory code for device 401, Override data structure 407 could return the override dialing rule for device 401 to call processing system 403. Call processing system 403 could then send a store message to VLR data structure 405 indicating the override dialing rule for device 401. VLR data structure 405 could replace the default dialing rule for device 401 with the override dialing rule for device 401. Call processing system 403 could then send a valid registration message to device 401.

After device 401 receives a valid registration message from call processing system 403, the user can use device 401 to place calls. If the user dials a directory code to place a call from device 401, device 401 could send a call message to call processing system 403. Call processing system 403 could then send a query message to VLR data structure 405 indicating the device code for device 401. VLR data structure 405 could return the dialing rule for device 401 to call processing system 403. Call processing system 403 could then apply the dialing rule to the directory code the user dialed from device 401. If the user has dialed the directory number in violation of the dialing rule for device 401, call processing system 403 may send an error message to device 401. If the user has dialed the directory number in accordance with the dialing rule for device 401, call processing system 403 could initiate call set-up for device 401.

In an advantage, a call processing system determines an override dialing rule for a device with a registration message and a call request indicating only a device code. A call processing system determines a directory code associated with the device code, and in turn, determines an override dialing rule associated with the directory code. Call processing systems can enforce telecommunications regulations without requiring carriers to divulge their customers' directory codes.

Figure 7:
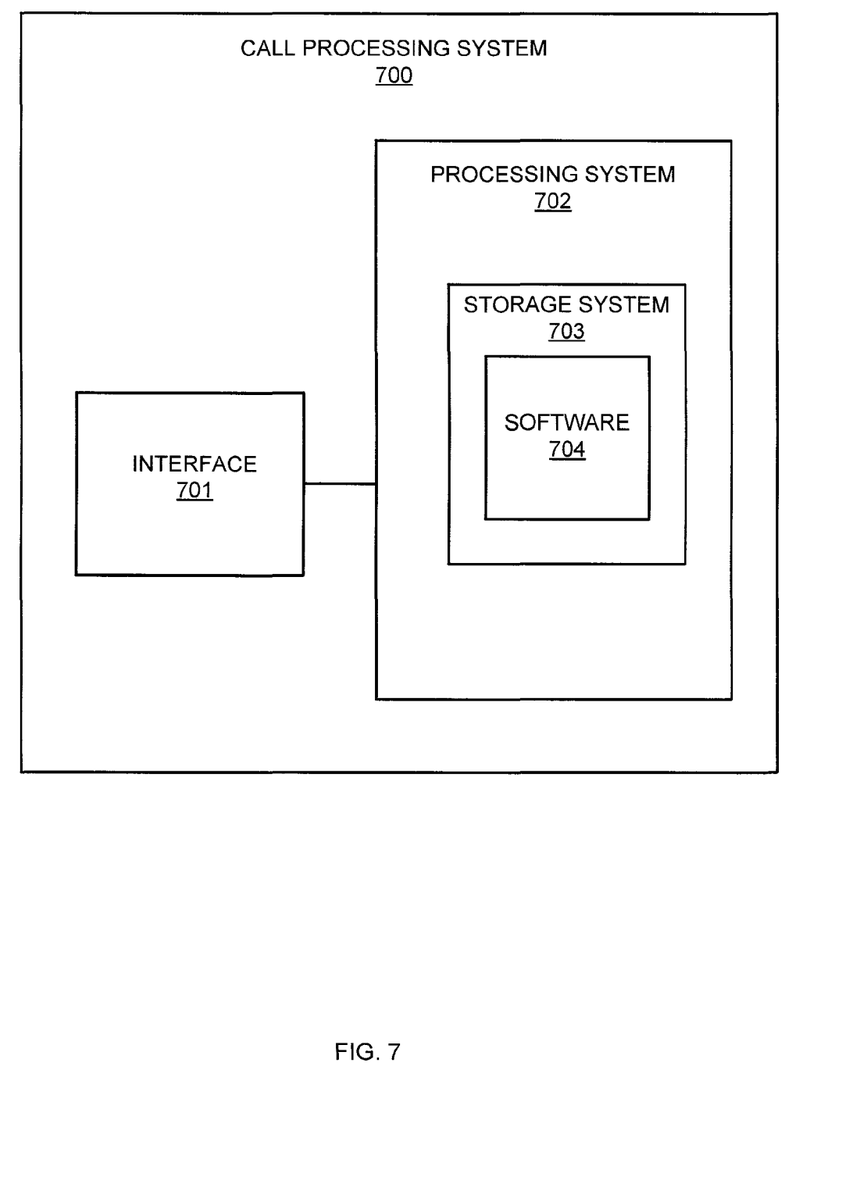
FIG. 7 illustrates an embodiment of the invention.

Call Processing System—FIG. 7

FIG. 7 illustrates call processing system 700 in an embodiment of the invention. Call processing system 700 includes interface 701, processing system 702, storage system 703, and software 704. Storage system 703 stores software 704. Processing system 702 is linked to interface 701. Call processing system 700 could be comprised of a programmed general-purpose computer, although those skilled in the art will appreciate that programmable or special purpose circuitry and equipment may be used. Call processing system 700 may use a client server architecture where operations are distributed among a server system and client devices that together comprise elements 701-604.

Interface 701 could comprise a network interface card, modem, port, or some other communication device. Interface 701 may be distributed among multiple communication devices. Processing system 702 could comprise a computer microprocessor, logic circuit, or some other processing device. Processing system 702 may be distributed among multiple processing devices. Storage system 703 could comprise a disk, tape, integrated circuit, server, or some other memory device. Storage system 703 may be distributed among multiple memory devices.

Processing system 702 retrieves and executes software 704 from storage system 703. Software 704 may comprise an operating system, utilities, drivers, networking software, and other software typically loaded onto a general-purpose computer. Software 704 could also comprise an application program, firmware, or some other form of machine-readable processing instructions. When executed by the processing system 702, software 704 directs processing system 702 to operate as described above for call processing systems 103 and 403.

What is claimed is:

1. A call processing system for processing calls in a communications network, the call processing system comprising:
   an interface configured to receive from a device a message to register the device with the communications network, wherein the message indicates a mobile station identifier associated with the device; and
   a processing system configured to process the message to determine a phone number associated with the device based on the mobile station identifier, process the phone number to determine if an override dialing rule applies, wherein if the override dialing rule applies, process the phone number to determine the override dialing rule based on the phone number, and apply the override dialing rule to calls placed from the device.

2. The call processing system of claim 1 wherein a default dialing rule applies to the calls placed from the device, and wherein the processing system is further configured to process the mobile station identifier to determine if the override dialing rule overrides the default dialing rule based on the mobile station identifier.

3. The call processing system of claim 2 wherein the processing system is further configured to override the default dialing rule with the override dialing rule if the mobile station identifier is within a range of mobile station identifiers.

4. The call processing system of claim 1 wherein a default dialing rule applies to the calls placed from the device, and wherein if the override dialing rule does not apply, the processing system is further configured to apply the default dialing rule to calls placed from the device.

5. The call processing system of claim 3 wherein the calls are placed from the device to phone numbers having a first portion and a second portion.

6. The call processing system of claim 5 wherein the override dialing rule requires a user to dial the first portion for the calls placed from the device.

7. The call processing system of claim 6 wherein the phone numbers have an NPA-NXX-XXXX format and wherein the first portion comprises the NPA part of the NPA-NXX-XXXX format and wherein the second portion comprises the NXX-XXXX part of the NPA-NXX-XXXX format.

8. The call processing system of claim 5 wherein the override dialing rule allows a user to dial only the second portion for the calls placed from the device.

9. The call processing system of claim 8 wherein the phone numbers have an NPA-NXX-XXXX format and wherein the first portion comprises the NPA part of the NPA-NXX-XXXX format and wherein the second portion comprises the NXX-XXXX part of the NPA-NXX-XXXX format.

10. The call processing system of claim 1 wherein the device comprises a wireless device.

11. A method of operating a call processing system, the method comprising:
- receiving a message to register a device with a communications network, wherein the message indicates a mobile station identifier associated with the device;
- processing the message to determine a phone number associated with the device based on the mobile station identifier;
- processing the phone number to determine if an override dialing rule applies,
  - wherein if the override dialing rule applies, processing the phone number to determine the override dialing rule based on the phone number, and applying the override dialing rule to calls placed from the device.

12. The method of claim 11, wherein a default dialing rule applies to the calls placed from the device, and where the method further comprises:
- processing the mobile station identifier to determine if the override dialing rule overrides the default dialing rule based on the mobile station identifier.

13. The method of claim 12 wherein the default dialing rule is overridden with the override dialing rule if the mobile station identifier is within a range of mobile station identifiers, and where the method further comprises:
- applying the override dialing rule to calls placed from the device.

14. The method of claim 11 wherein a default dialing rule applies to the calls placed from the device, and wherein if the override dialing rule does not apply, the method further comprises:
- applying the default dialing rule to calls placed from the device.

15. The method of claim 13 wherein the calls are placed from the device to phone numbers having a first portion and a second portion.

16. The method of claim 15 wherein the override dialing rule requires a user to dial the first portion for the calls placed from the device.

17. The method of claim 16 wherein the phone numbers have an NPA-NXX-XXXX format and wherein the first portion comprises the NPA part of the NPA-NXX-XXXX format and wherein the second portion comprises the NXX-XXXX part of the NPA-NXX-XXXX format.

18. The method of claim 15 wherein the override dialing rule allows a user to dial only the second portion for the calls placed from the device.

19. The method of claim 18 wherein the phone numbers have an NPA-NXX-XXXX format and wherein the first portion comprises the NPA part of the NPA-NXX-XXXX format and wherein the second portion comprises the NXX-XXXX part of the NPA-NXX-XXXX format.

20. The method of claim 11 wherein the device comprises a wireless device.

21. A software product comprising:
- a non-transitory computer-readable medium carrying one or more sequences of instructions for operating a call processing system wherein execution of the one or more sequences of instructions by one or more processors causes the one or more processors to:
  - receive a message to register a device with a communications network, wherein the message indicates a mobile station identifier associated with the device;
  - process the message to determine a phone number associated with the device based on the mobile station identifier;
  - process the phone number to determine if an override dialing rule applies,
    - wherein if the override dialing rule applies process the phone number to determine the override dialing rule based on the phone number, and apply the override dialing rule to calls placed from the device.

22. The software product of claim 21 wherein a default dialing rule applies to the calls placed from the device, and where execution of the one or more sequence of instructions by the one or more of the processors cause the one or more processors to further:
- process the mobile station identifier to determine if the override dialing rule overrides the default dialing rule based on the mobile station identifier.

23. The software product of claim 22 wherein the default dialing rule is overridden with the override dialing rule if the mobile station identifier is within a range of mobile station identifiers, and where execution of the one or more sequence of instructions by the one or more of the processors cause the one or more processors to further:
- apply the override dialing rule to calls placed from the device.

24. The software product of claim 21 wherein a default dialing rule applies to the calls placed from the device, and wherein if the override dialing rule does not apply, the execution of the one or more sequence of instructions by the one or more of the processors cause the one or more processors to further:
- apply the default dialing rule to calls placed from the device.

25. The software product of claim 23 wherein the calls are placed from the device to phone numbers having a first portion and a second portion.

26. The software product of claim 25 wherein the override dialing rule requires a user to dial the first portion for the calls placed from the device.

27. The software product of claim 26 wherein the phone numbers have an NPA-NXX-XXXX format and wherein the first portion comprises the NPA part of the NPA-NXX-XXXX format and wherein the second portion comprises the NXX-XXXX part of the NPA-NXX-XXXX format.

28. The software product of claim 25 wherein the override dialing rule allows a user to dial only the second portion for the calls placed from the device.

29. The software product of claim 28 wherein the phone numbers have an NPA-NXX-XXXX format and wherein the first portion comprises the NPA part of the NPA-NXX-XXXX format and wherein the second portion comprises the NXX-XXXX part of the NPA-NXX-XXXX format.

30. The software product of claim 21 wherein the device comprises a wireless device.

* * * * *